(12) United States Patent
Agiwal et al.

(10) Patent No.: US 10,531,282 B2
(45) Date of Patent: *Jan. 7, 2020

(54) LOGICAL ADDRESS ASSIGNMENT IN A CLOUD CELL

(71) Applicant: Samsung Electronics Co., Ltd., Suwon-si, Gyeonggi-do (KR)

(72) Inventors: Anil Agiwal, Byrasandra (IN); Anshuman Nigam, Byrasandra (IN); Young-bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

This patent is subject to a terminal disclaimer.

(21) Appl. No.: 15/640,910

(22) Filed: Jul. 3, 2017

(65) Prior Publication Data

US 2017/0303117 A1 Oct. 19, 2017

Related U.S. Application Data

(63) Continuation of application No. 14/353,158, filed as application No. PCT/KR2012/008549 on Oct. 18, 2012.

(30) Foreign Application Priority Data

Oct. 20, 2011 (IN) .......................... 3610/CHE/2011
Oct. 10, 2012 (IN) .......................... 3610/CHE/2011

(51) Int. Cl.
*H04W 8/26* (2009.01)
*H04W 88/08* (2009.01)

(52) U.S. Cl.
CPC .............. *H04W 8/26* (2013.01); *H04W 88/08* (2013.01)

(58) Field of Classification Search
CPC ......... H04W 8/26; H04W 4/06; G06F 15/177; G06F 15/16; G06F 15/173
See application file for complete search history.

(56) References Cited

U.S. PATENT DOCUMENTS

| 5,708,655 A | 1/1998 | Toth et al. |
| 2004/0103275 A1 | 5/2004 | Ji et al. |

(Continued)

FOREIGN PATENT DOCUMENTS

| JP | 2007-20026 A | 1/2007 |
| JP | 2007-515111 A | 6/2007 |

(Continued)

OTHER PUBLICATIONS

Taori et al., Cloud Cell: Paving the Way for Edgeless Networks, IEEE Global Communications Conference (Globecom) 2013—Wireless Communications Symposium, Dec. 9, 2013, pp. 3546-3552, XP032604738, IEEE.

(Continued)

*Primary Examiner* — Muthuswamy G Manoharan
(74) *Attorney, Agent, or Firm* — Jefferson IP Law, LLP

(57) ABSTRACT

A method and system for assigning a unique logical address in a cloud cell having a mobile station, slave base stations and a master base station are provided. The method includes determining at least one unassigned logical address from respective address spaces associated with the slave base stations and the master base station in the cloud cell by the master base station, selecting the unique logical address from the at least one unassigned logical address determined from the respective address spaces associated with the plurality of base stations, and assigning the selected unique logical address to the mobile station in the cloud cell. The (Continued)

mobile station and each of the plurality of base stations communicate in the cloud cell using the assigned unique logical address.

18 Claims, 14 Drawing Sheets

(56) References Cited

U.S. PATENT DOCUMENTS

| | | |
|---|---|---|
| 2005/0122946 A1 | 6/2005 | Won |
| 2007/0060134 A1 | 3/2007 | Bhatti et al. |
| 2009/0006596 A1 | 1/2009 | Dinakaran et al. |
| 2009/0093232 A1 | 4/2009 | Gupta et al. |
| 2009/0129354 A1 | 5/2009 | Gupta et al. |
| 2010/0074226 A1 | 3/2010 | Gandham et al. |
| 2011/0142017 A1 | 6/2011 | Coldren |
| 2011/0238793 A1* | 9/2011 | Bedare ............... H04L 45/586 709/220 |
| 2011/0249651 A1 | 10/2011 | Kang et al. |
| 2011/0299499 A1* | 12/2011 | Kojima ............ H04L 29/12254 370/329 |
| 2012/0039314 A1* | 2/2012 | Osborn ................ H04W 24/02 370/338 |
| 2014/0112282 A1 | 4/2014 | Wijting et al. |

FOREIGN PATENT DOCUMENTS

| | | |
|---|---|---|
| JP | 2009-153142 A | 7/2009 |
| JP | 2011-501917 A | 1/2011 |
| KR | 10-2007-0094310 A | 9/2007 |
| KR | 10-2011-0113863 A | 10/2011 |
| WO | 2009/148752 A2 | 12/2009 |
| WO | 2010/097949 A1 | 2/2010 |
| WO | 2010/072250 A1 | 7/2010 |

OTHER PUBLICATIONS

Lin et al., Handling the Backhaul Link Failure for IEEE 802.16m Femto ABSs, 2011 40th International Conference on Parallel Processing Workshops (ICPPW), Sep. 13, 2011, pp. 108-113, XP032460961, IEEE.

Papapanagiotou et al., A Survey on Next Generation Mobile WiMAX Networks: Objectives, Features and Technical Challenges, IEEE Communications Surveys & Tutorials, Oct. 1, 2009, pp. 3-18, vol. 11, No. 4, XP011297978, IEEE.

Korean Office Action dated Jul. 20, 2018, issued in connection with a counterpart Korean application No. 10-2014-7013023.

* cited by examiner

LOGICAL ADDRESS ASSIGNMENT IN A CLOUD CELL

CROSS-REFERENCE TO RELATED APPLICATION(S)

This application is a continuation application of prior U.S. application Ser. No. 14/353,158, filed on Apr. 21, 2014, which is a U.S. National Stage application under 35 U.S.C. § 371 of an International application filed on Oct. 18, 2012 and assigned application number PCT/KR2012/008549, which claimed the benefit of an Indian patent application filed on Oct. 20, 2011 in the Indian Intellectual Property Office and assigned Serial number 3610/CHE/2011 and an Indian patent application filed on Oct. 10, 2012 in the Indian Intellectual Property Office and assigned Serial number 3610/CHE/2011, the entire disclosure of each of which is hereby incorporated by reference.

TECHNICAL FIELD

The present disclosure relates to the field of mobile broadband systems, with multiple base stations serving a single mobile station. More particularly, the present disclosure relates to a method and system for assigning a logical address to a mobile station in a cloud cell.

BACKGROUND

Millimetre-Wave Mobile Broadband (MMB) system is a millimetre wave based system which operates in a radio frequency range of 30 Gigahertz (GHZ) and 300 GHz. MMB system uses radio waves with wavelength in range of 1 millimetre (mm) to 10 mm and is a candidate for a next generation mobile communication technology due to a considerable amount of spectrum available in the mmWave band.

Generally, in a MMB system, MMB base stations are deployed with a higher density than macro-cellular base stations in order to ensure adequate network coverage. This is possible as transmission and reception of signals is based on narrow beams which suppress interference from neighboring MMB base stations and extend the range of an MMB link.

Typically, in a MMB network, multiple base stations form a grid with a large number of nodes with which a mobile station may communicate, thereby ensuring high quality Equal Grade Of Service (EGOS) irrespective of the location of the mobile station. The grid having a plurality of base stations serving a mobile station is commonly termed as virtual cell or cloud cell. In a cloud cell, the multiple base stations communicating with a mobile station need to perform downlink transmission beamforming while the mobile station communicating with the base stations need to perform downlink reception beamforming for receiving downlink control information and data packets. Similarly, a mobile station communicating with a base station in a cloud cell may need to perform uplink transmission beamforming while the base station needs to perform uplink reception beamforming for transmitting uplink data.

Further, in a cloud cell, one of base stations acts as a master base station and remaining base stations act as slave base stations with respect to the mobile station. The base stations in the cloud cell serving a mobile station keep changing dynamically based on movement of the mobile station. The cloud cell thus is a user centric virtual cell. In overlapping cloud cell scenario, a base station may be a part of more than one cloud cell. In one cloud cell, the base station acts as a master base station for one mobile station and in another cloud cell, the base station act as a slave base station for another mobile station or the base station may act as a master base station for another mobile station.

Generally, in a cellular system of the related art, a mobile station communicates with a single base station and is assigned a unique logical address by the base station. The logical address assigned by the base station distinguishes one mobile station from another mobile station in the domain of the base station that has assigned the logical address. Typically, the logical address assigned to the mobile station is used by the base station for signaling resource allocation information to each mobile station. The logical address in the resource allocation signaling enables the mobile station to determine whether the resource allocation signaling received from the base station is intended for itself or some other mobile station. Also, the logical address is used by the mobile station in bandwidth request signaling transmitted to the base station. The logical address in the bandwidth request enables the base station to uniquely identify the mobile station from whom the bandwidth request is received. Accordingly, the base station may allocate resources to the mobile station associated with the logical address. Moreover, the logical address assigned to the mobile station is also used to scramble physical layer protocol data units.

In a cloud cell environment, a mobile station communicates with multiple base stations and receives data and control information from multiple base stations. In order to communicate with multiple base stations each of the base station assigns an individual logical address that is unique across the mobile stations in the base station's domain. The mobile station needs to maintain multiple logical addresses and has to use the logical address specific to the base station with which the mobile station communicates. The mobile station may receive/transmit data and control packets from one or more base stations dynamically as directed by the master base station in the cloud cell. This leads to increased complexity at the mobile station as the mobile station has to keep determining the base stations from which it has to communicate and then configure the logical address for transmit/receive processing for determined base stations.

The Medium Access Control (MAC) layer in the mobile station also needs to be aware of the base station with which the mobile station is communicating in order to prepare the control message (for e.g. bandwidth request) and data packets (Security algorithms uses logical address to protect data packets) carrying the appropriate logical address. This would lead to delayed building of data packets and control packets by the MAC layer in the mobile station. In a high speed network, this delayed building of data packets is not desirable for fast processing.

Accordingly, a method and system for assigning logical address to a mobile station in a cloud cell is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for assigning logical address to a mobile station in a cloud cell.

In accordance with an aspect of the present disclosure, a method of assigning a unique logical address in a cloud cell is provided. The method includes one mobile station and a plurality of base stations, the plurality of base stations includes at least one slave base stations and a master base station. The method includes determining at least one unassigned logical address from respective address spaces associated with the plurality of base stations in the cloud cell by the master base station, selecting the unique logical address from the at least one unassigned logical address determined from the respective address spaces associated with the plurality of base stations, and assigning the selected unique logical address to the mobile station in the cloud cell. The mobile station and each of the plurality of base stations communicate in the cloud cell using the assigned unique logical address.

In accordance with another aspect of the present disclosure, a base station is provided. The base station includes a processor, and a memory coupled to the processor. the memory includes an address assignment module configured to determine at least one unassigned logical address from respective address spaces associated with a plurality of base stations in a cloud cell, select an unique logical address from the at least one unassigned logical address determined from the respective address spaces associated with the plurality of base stations, and assign the selected unique logical address to a mobile station in the cloud cell. The mobile station and each of the plurality of base stations communicate in the cloud cell using the assigned unique logical address.

In accordance with further another aspect of the present disclosure, a system is provided. The system includes one cloud cell comprising a plurality of base stations. One of the plurality of base stations is a master base station and remaining of the plurality of base stations are slave base stations, and a mobile station. The master base station is configured to determine at least one unassigned logical address from respective address spaces associated with the plurality of base stations, to select the unique logical address from the at least one unassigned logical address determined from the respective address spaces associated with the plurality of base stations, and to assign the selected unique logical address to the mobile station in the cloud cell. The mobile station and each of the plurality of base stations communicate in the cloud cell using the assigned unique logical address.

An aspect of an embodiment of the present disclosure is to provide a method and system for assigning logical address to a mobile station in a cloud cell.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
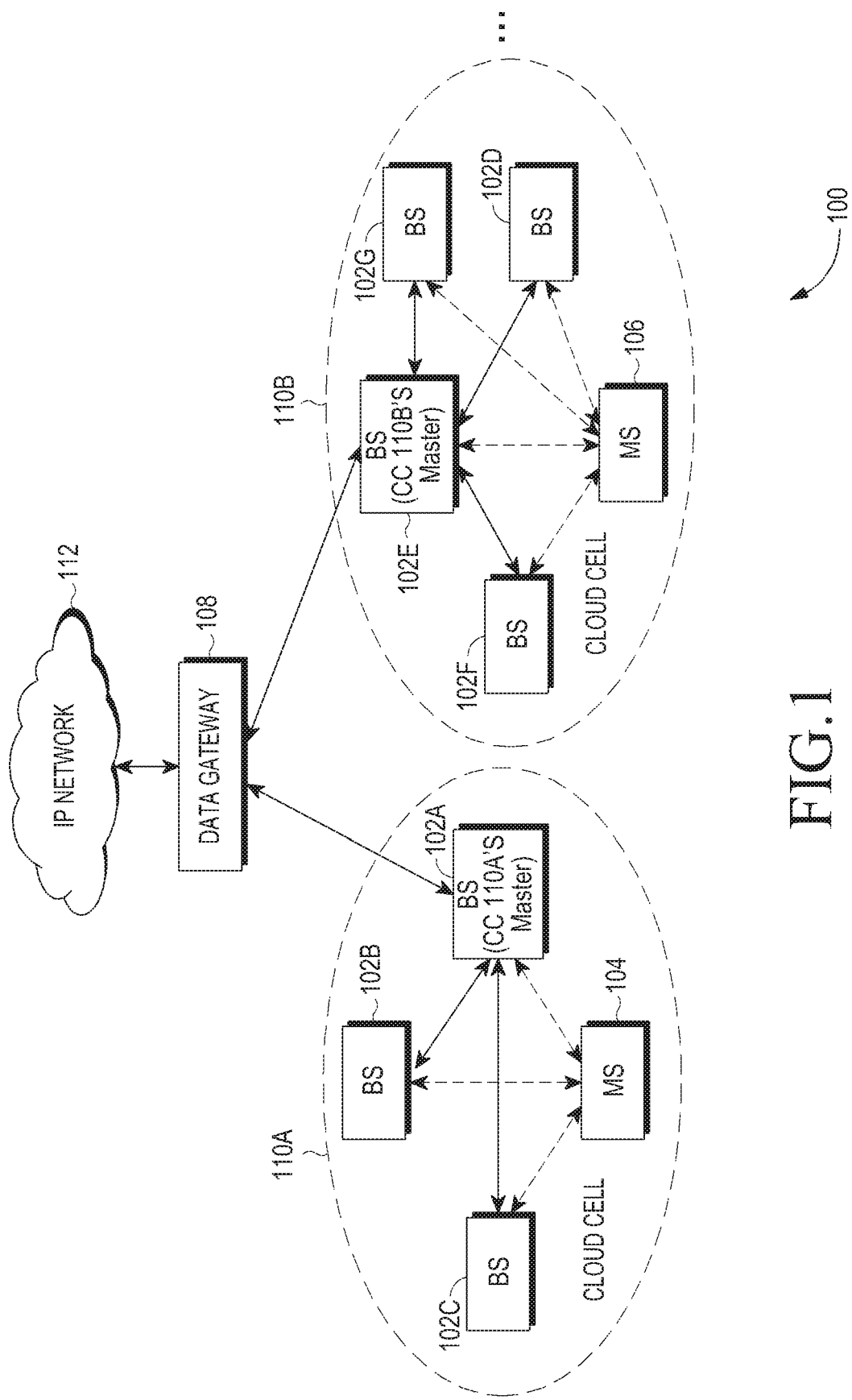
FIG. 1 is a schematic diagram illustrating a cloud cell environment according to an embodiment of the present disclosure.

FIG. 1 is a schematic diagram illustrating a cloud cell environment 100 according to an embodiment of the present disclosure.

Referring to FIG. 1, the cloud cell environment 100 includes a plurality of cloud cells 110A-N. A cloud cell is a user centric virtual cell consisting of plurality of base stations serving a mobile station. A cloud cell serving a mobile station may have same base stations as in another cloud cell serving another mobile station. Also, a cloud cell serving a mobile station may have some base stations same as base stations in another cloud cell serving another mobile station. On the other hand, a cloud cell serving a mobile station may have all distinct base stations from base stations in another cloud cell serving another mobile station.

For the purpose of illustration, two cloud cells viz. the cloud cell 110A and the cloud cell 110B are depicted in FIG. 1. The cloud cell 110A includes a multiple Base Stations (BSs) 102A to 102C serving a Mobile Station (MS) 104. In the cloud cell 110A, the BS 102A is assigned a role of a master and remaining BSs 102B and 102C acts as a slave BS. Similarly, the cloud cell 110B includes multiple BSs 102D to 102G serving a mobile station 106. In the cloud cell 110B, the BS 102E is a master BS while the remaining BSs 102D, 102F and 102G acts as slave BSs. In each of the cloud cells 110A-N, a master BS may directly communicate data packets with a data gateway 108 while a slave BS communicates with the data gateway via the master BS. The data gateway 108 may be directly connected to an Internet Protocol (IP) network 112 or connected via other network nodes.

It may be noted that a cloud cell consisting of two or more BSs is formed when a mobile station enters a wireless network. BSs in a cloud cell as well as a master BS keep changing based on the movement of the mobile station. When a BS joins and/or exits the cloud cell, the cloud cell is said to be updated.

According to the present disclosure, a mobile station in a cloud cell is assigned a single unicast logical address to communicate with plurality of BSs in the cloud cell. The unicast logical address is used to uniquely identify the mobile station across the BSs in the cloud cell. The logical address is determined from address spaces of BSs in the cloud cell, where each BS maintains an independent address space having the same set of addresses as any other BS.

One of the BSs in each of the cloud cells 110A and 110B is configured for assigning unique logical address to the mobile stations 104 and 106 when the respective cloud cells 110A and 110B are formed or updated. For example, when the cloud cell 110A is formed or updated, the master BS 102A determines common unassigned logical addresses among independent address spaces associated with the BSs 102A to 102C. The term 'unassigned logical address' refers to a logical address in an address space that is not yet assigned by a particular base station to any mobile station in a wireless network environment. The master BS 102A selects a unique logical address from the common unassigned logical addresses identified from the address spaces of the BSs 102A to 102C and assigns the selected unique logical address to the mobile station 104. Additionally, the master BS 102A notifies the BSs 102B and 102C regarding assignment of the unique logical address to the mobile station 104 so that the BSs 102A to 102C and the mobile station 104 communicate in the cloud cell 110A using the unique logical address.

Figure 2A:
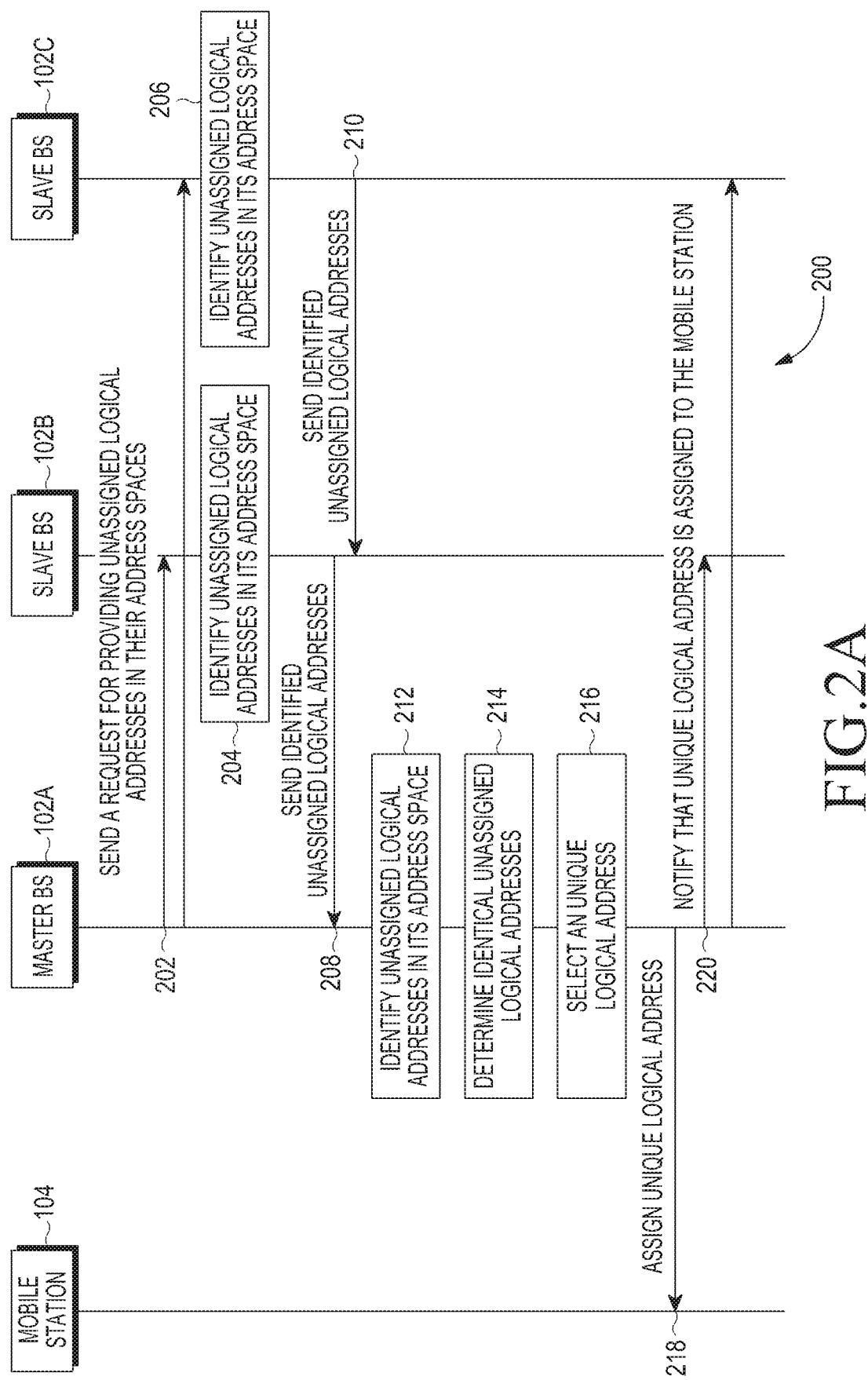
FIG. 2A is a process flow diagram illustrating a method of assigning a unique logical address to a mobile station during formation of a cloud cell according to an embodiment of the present disclosure.

FIG. 2A is a process flow diagram illustrating a method of assigning a unique logical address to a mobile station during formation of a cloud cell according to an embodiment of the present disclosure.

Referring to FIG. 2A, in a method 200, consider that a cloud cell 110A is newly formed and consists of base stations 102A through 102C and a mobile station 104. Also, consider that the base station 102A is a master base station (BS) and the base stations 102B and 102C are slave BSs. Each of the base stations 102A through 102C maintains individual address space (e.g., containing 4096 logical addresses).

At operation 202, the master BS 102A sends a request to the slave BSs 102B and 102C for sending unassigned logical addresses in their respective address spaces. At operation 204, the slave BS 102B identifies unassigned logical addresses in the slave BS 102B's address space. Similarly, at operation 206, the slave BS 102C identifies unassigned logical addresses in the slave BS 102C's address space. At operation 208, the slave BS 102B sends the identified unassigned logical addresses in the slave BS 102B's address space to the master BS 102A. Similarly, at operation 210, the slave BS 102C sends the identified unassigned logical addresses in the slave BS 102C's address space to the master BS 102A.

At operation 212, the master BS 102A identifies unassigned logical addresses in the master BS 102A's address space. At operation 214, the master BS 102A determines one or more identical unassigned logical addresses using the unassigned logical addresses identified in the address space associated with the master BS 102A and the unassigned logical addresses received from the slave BSs 102B and 102C. At operation 216, the master BS 102A selects a unique logical address from the one or more identical unassigned logical addresses. At operation 218, the master BS 102A assigns the selected unique logical address to the mobile station 104.

At operation 220, the master BS 102A notifies assignment of the unique logical address to the mobile station 104 to the slave BSs 102B and 102C so that the BSs 102A through 102C and the mobile station 104 communicate in the cloud cell 110A using the unique logical address. In some various embodiments, the master BS 102A notifies the unique logical address assigned to the mobile station 104 and an identifier associated with the cloud cell 110A to the slave BSs 102B and 102C. For example, a slave BS in the cloud cell environment may be member of multiple cloud cells. A master BS for several cloud cells for which the slave BS is a member may also be same. So it is desirable that, while notifying the slave BS regarding assignment of a unique logical address assigned to a mobile station in a cloud cell, identity of the cloud cell is indicated to the slave BS. In one embodiment, the master BS 102A includes a permanent identity (e.g., Medium Access Control (MAC) address, International Mobile Subscriber Identity (IMSI), etc.) of the cloud cell 110A in a notification which indicates assignment of the unique logical address to the mobile station 104 sent to the slave BSs 102B and 102C. In alternate embodiment, if a pair of base stations, wherein the first BS is a master BS and the second BS is a slave BS, are part of multiple cloud cells in the same role, then the tuple <first base station (master), second base station (slave), mobile station served by cloud cell> is assigned an identifier. The first BS acting as a master BS includes the identifier in a notification indicating assignment of the unique logical address to the mobile station sent to the second BS acting as a slave BS. For example, consider two BSs, for example, BS1 and BS2 that are member of two cloud cells A and B, where the cloud cell A serves a mobile station 1 and the cloud cell B serves the mobile station 2. BS1 is a Master BS and BS2 is slave BS in both the cloud cells A and B. Consider that, the tuple <BS1, BS2, MS1> is assigned ID1 while the tuple <BS 1, BS2, MS2> is assigned ID2. In such case, the master BS BS1 uses ID1 and ID2 to distinguish between the mobile station 1 and the mobile station 2 respectively while communicating with the slave base station BS2.

Figure 2B:
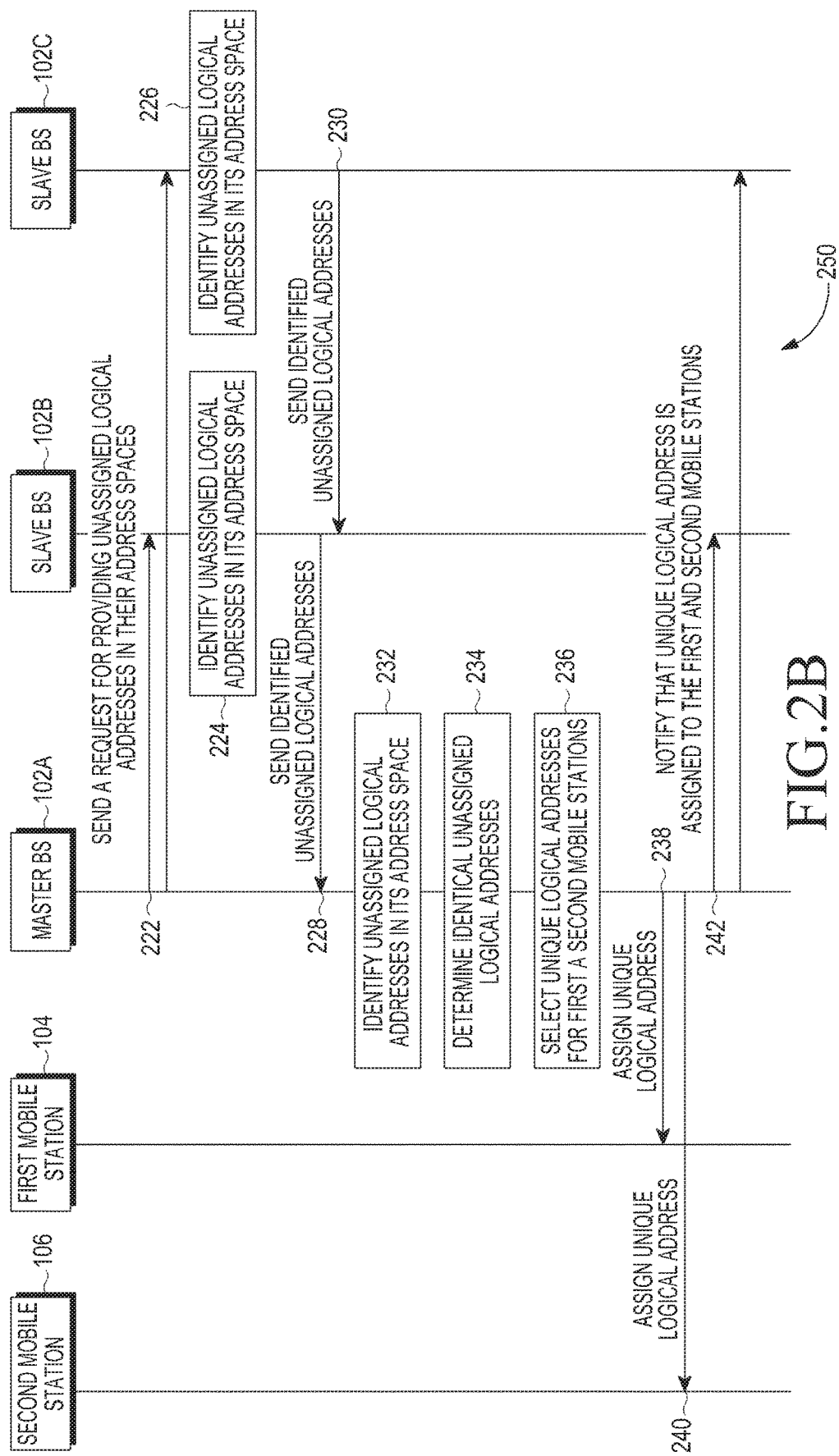
FIG. 2B is a process flow diagram illustrating an alternate method of assigning a unique logical address to multiple mobile stations during formation of a cloud cell according to an embodiment of the present disclosure.

FIG. 2B is a process flow diagram illustrating an alternate method of assigning a unique logical address to multiple mobile stations during formation of a cloud cell according to an embodiment of the present disclosure.

Referring to FIG. 2B, in a method 250, consider that a cloud cell 110A is newly formed and consists of base stations 102A through 102C and two mobile stations 104 and 106. Also, consider that the base station 102A is a master base station (BS) and the base stations 102B and 102C are slave BSs. In the method 250, the operations 222 to 242 illustrate a process of assigning a unique logical address to the mobile stations 104 and 106. The method 250 of FIG. 2B is similar to the method 200 of FIG. 2A, except the operations 236, 238, 240 and 242.

At operation 236, the master BS 102A selects two unique logical addresses to be assigned to the mobile stations 104 and 106 from the identical unassigned logical addresses. At operation 238, the master BS 102A assigns the selected unique logical address to the mobile station 104. At operation 240, the master BS 102A assigns the selected unique logical address to the mobile station 106. At operation 242, the master BS 102A notifies assignment of the unique logical address to the mobile stations 104 and 106 to the slave BSs 102B and 102C. Accordingly, the BSs 102A through 102C and the mobile stations 104 and 106 communicate in the cloud cell 110A using the respective unique logical addresses.

Figure 2C:
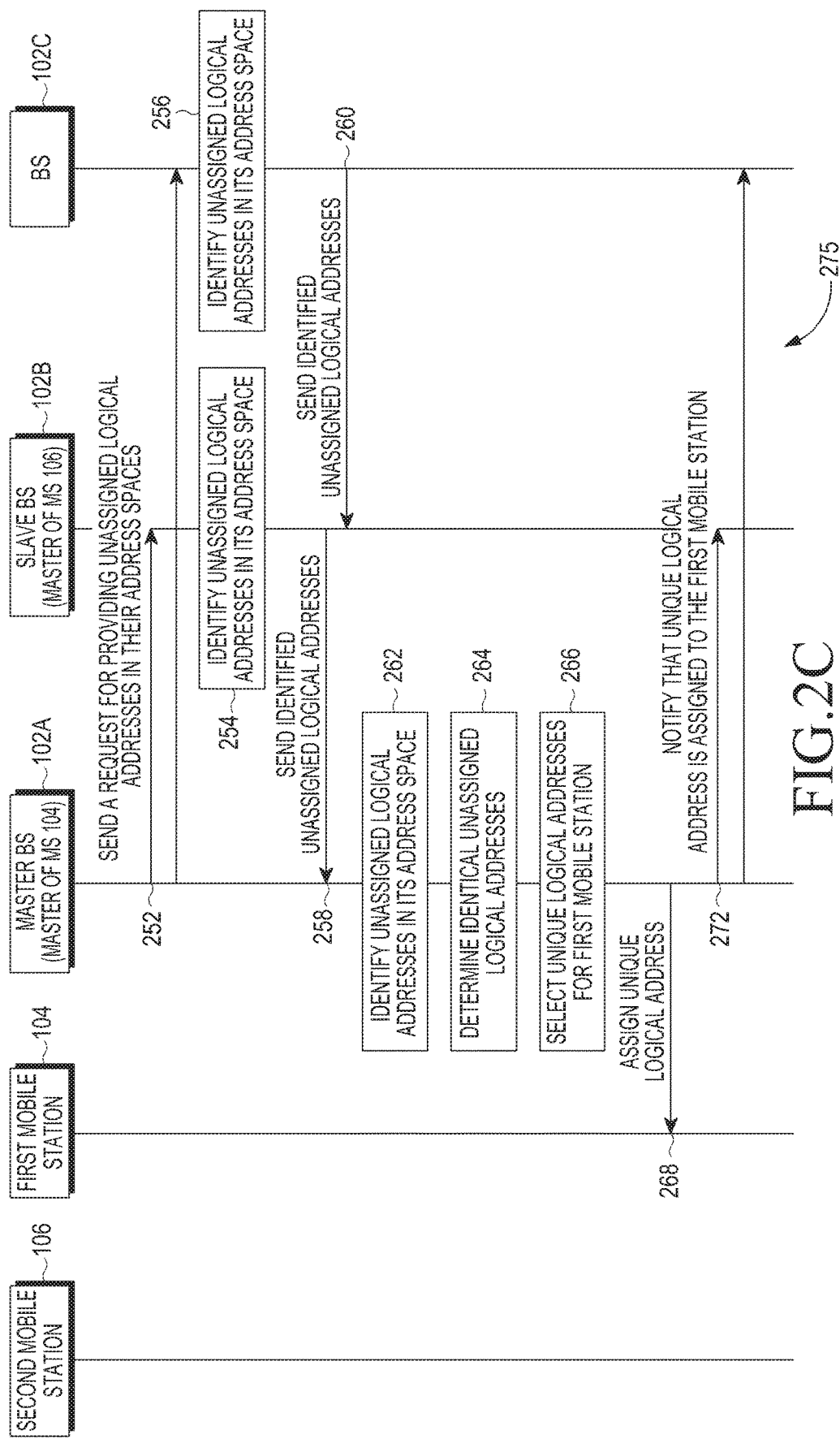
FIGS. 2C and 2D are process flow diagrams illustrating another alternate method of assigning a unique logical address to multiple mobile stations during formation of a cloud cell according to an embodiment of the present disclosure.
Figure 2D:
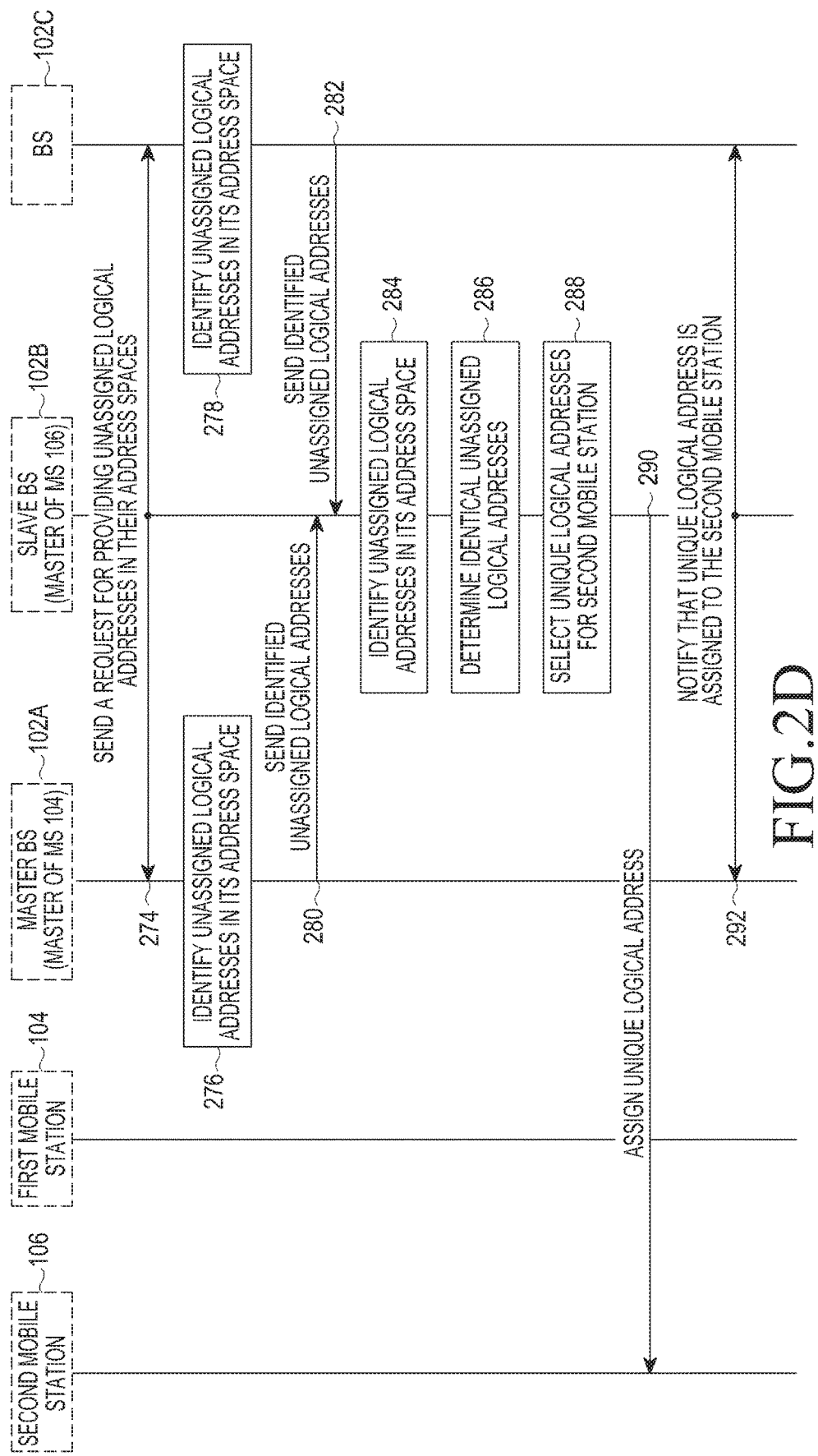

FIGS. 2C and 2D are process flow diagrams illustrating an alternate method of assigning a unique logical address to multiple mobile stations during formation of a cloud cell according to an embodiment of the disclosure.

Referring to FIGS. 2C and 2D, in a method 275, consider that a cloud cell 110A is newly formed and consists of base stations 102A through 102C and two mobile stations 104 and 106. Also, consider that the base station 102A is a master base station (BS) and the base stations 102B and 102C are slave BSs with respect to the mobile station 104. Similarly, the base station 102B is a master base station (BS) and the base stations 102A and 102C are slave BSs with respect to the mobile station 106. In a method 275, the operations 252, 254, 256, 258, 260, 262, 264, 268, 270 and 272 illustrate a process of assigning a unique logical address to the mobile station 104 by the master BS 102A. The operations 252, 254, 256, 258, 260, 262, 264, 268, 270 and 272 in FIG. 2B are similar to the operations 202, 204, 206, 208, 210, 212, 214, 216, 218 and 220 in FIG. 2A. Similarly, in the method 275, the operations 274, 276, 278, 280, 282, 284, 286, 288, 290 and 292 illustrate a process of assigning a unique logical address to the mobile station 106 by the master BS 102B. It may be noted that, the operations 274, 276, 278, 280, 282, 284, 286, 288, 290 and 292 in FIG. 2B are similar to the operation 202, 204, 206, 208, 210, 212, 214, 216, 218 and 220 in FIG. 2A.

It may be noted that, if a BS is already involved in address assignment for one MS, the BS postpones address assignment for another MS until the address assignment for the first MS is complete. For example, in FIG. 2B, the master base station 102B postpones address assignment for the mobile station 106 until the address assignment for the mobile station 104 is complete.

Figure 3:
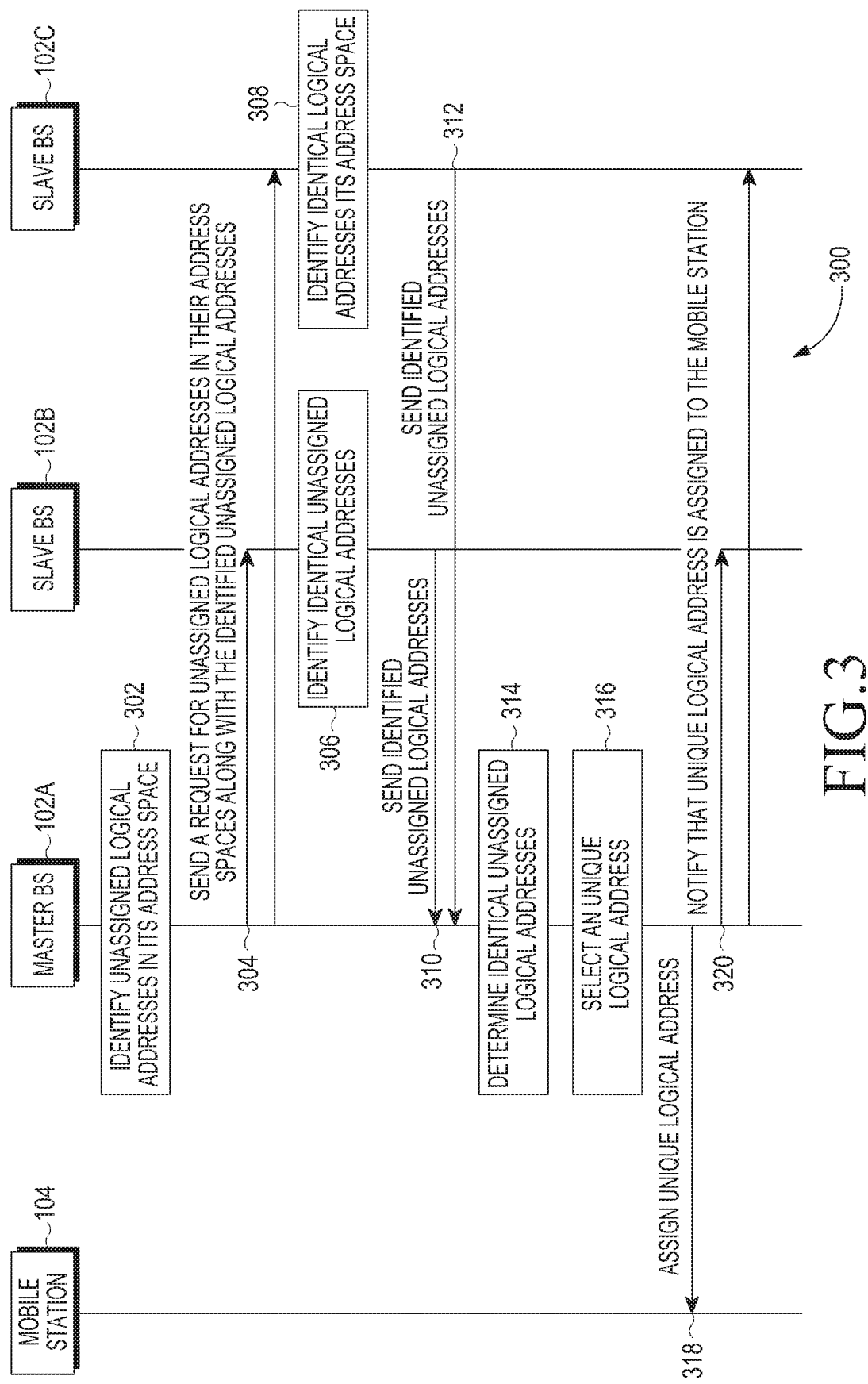
FIG. 3 is a process flow diagram illustrating a method of assigning a unique logical address to the mobile station during formation of the cloud cell according to another embodiment of the present disclosure.

FIG. 3 is a process flow diagram illustrating a method of assigning a unique logical address to a mobile station during formation of a cloud cell according to another embodiment of the present disclosure.

Referring to FIG. 3, in a method 300, at operation 302, the master BS 102A identifies unassigned logical addresses in the master BS 102A's address space. At operation 304, the master BS 102A sends a request for unassigned logical addresses in their respective address spaces along with the identified unassigned logical addresses to the slave BSs 102B and 102C. At operation 306, the slave BS 102B identifies identical unassigned logical addresses in the address spaces of the slave BS 102B and the master BS 102A using the identified unassigned logical addresses received from the master BS 102A. Similarly, at operation 308, the slave BS 102C identifies identical unassigned logical addresses in the address spaces of the slave BS 102C and the master BS 102A using the identified unassigned logical addresses received from the master BS 102A. At operation 310, the slave BS 102B sends a list of identical unassigned logical addresses to the master BS 102A. Similarly, at operation 312, the slave BS 102C sends a list of identical unassigned logical addresses to the master BS 102A.

At operation 314, the master BS 102A determines one or more identical unassigned logical addresses using the list of identical unassigned logical addresses received from the slave BS 102B and the list of identical unassigned logical addresses received from the slave BS 102C. At operation 316, the master BS 102A selects a unique logical address from the one or more identical unassigned logical addresses. At operation 318, the master BS 102A assigns the selected unique logical address to the mobile station 104. At operation 320, the master BS 102A notifies assignment of the unique logical address to the mobile station 104 to the slave BSs 102B and 102C. Accordingly, the BSs 102A through 102C and the mobile station 104 communicate in the cloud cell 110A using the unique logical address.

Figure 4:
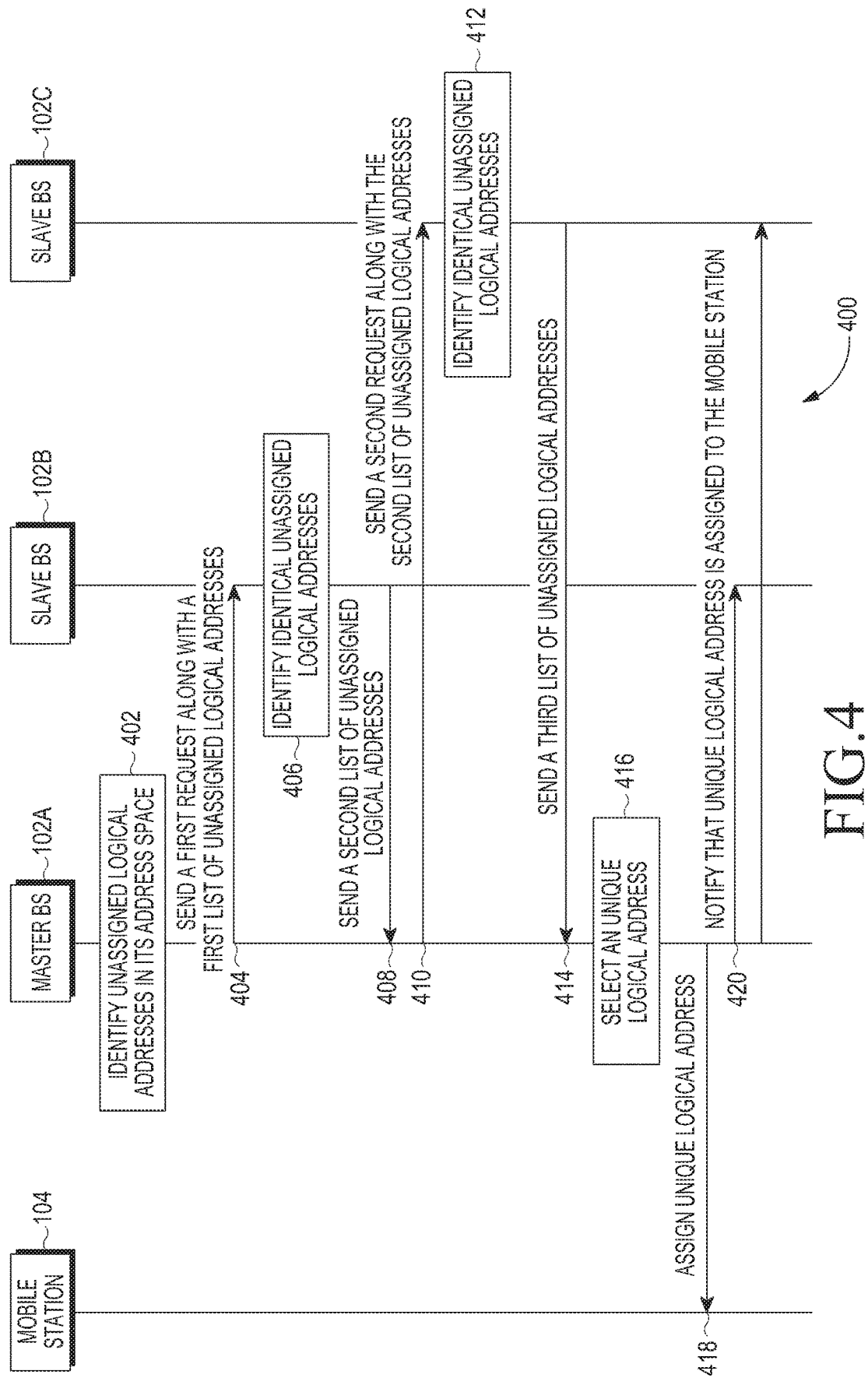
FIG. 4 is a process flow diagram illustrating a method of assigning a unique logical address to the mobile station during formation of the cloud cell according to yet another embodiment of the present disclosure.

FIG. 4 is a process flow diagram illustrating a method of assigning a unique logical address to a mobile station during formation of a cloud cell 110A according to yet another embodiment of the present disclosure.

Referring to FIG. 4, in a method 400, at operation 402, the master BS 102A identifies unassigned logical addresses in master BS 102A's address space. At operation 404, the master BS 102A sends a first request to the slave BS 102B for sending unassigned logical addresses in the master BS 102A's respective address space along with a first list of unassigned logical addresses containing the identified unassigned logical addresses associated with master BS 102A. At operation 406, the slave BS 102B identifies identical unassigned logical addresses in the address spaces of the slave BS 102B and the master BS 102A using the identified unassigned logical addresses in the first list received from the master BS 102A. At operation 408, the slave BS 102B sends a second list of identical unassigned logical addresses to the master BS 102A.

At operation 410, the master BS 102A sends a second request to the slave BS 102C for sending unassigned logical addresses in the master BS 102A's respective address space along with the second list of identical unassigned logical addresses. At operation 412, the slave BS 102C identifies identical unassigned logical addresses between the address space of the slave BS 102C and the second list of identical unassigned logical addresses received from the master BS 102A. At operation 414, the slave BS 102C sends a third list of identical unassigned logical addresses to the master BS 102A. In some various embodiments, the master BS 102A may determine whether there is any slave BS left in the cloud cell 110A. If it is determined that one or more slave BSs are left in the cloud cell 110A, the operations 410, 412 and 414 are repeated till the master BS 102A receives a list of identical unassigned addresses from the last slave BS.

In this case, since the slave BS 102C is a last slave base station in the cloud cell 110A, the master BS 102A directly performs operation 416. At operation 416, the master BS 102A selects a unique logical address from the one or more identical unassigned logical addresses in the third list of identical unassigned logical addresses received from the slave BS 102C. At operation 418, the master BS 102A assigns the selected unique logical address to the mobile station 104. At operation 420, the master BS 102A notifies assignment of the unique logical address to the mobile station 104 to the slave BSs 102B and 102C. Accordingly, the BSs 102A through 102C and the mobile station 104 communicate in the cloud cell 110A using the unique logical address.

Figure 5:
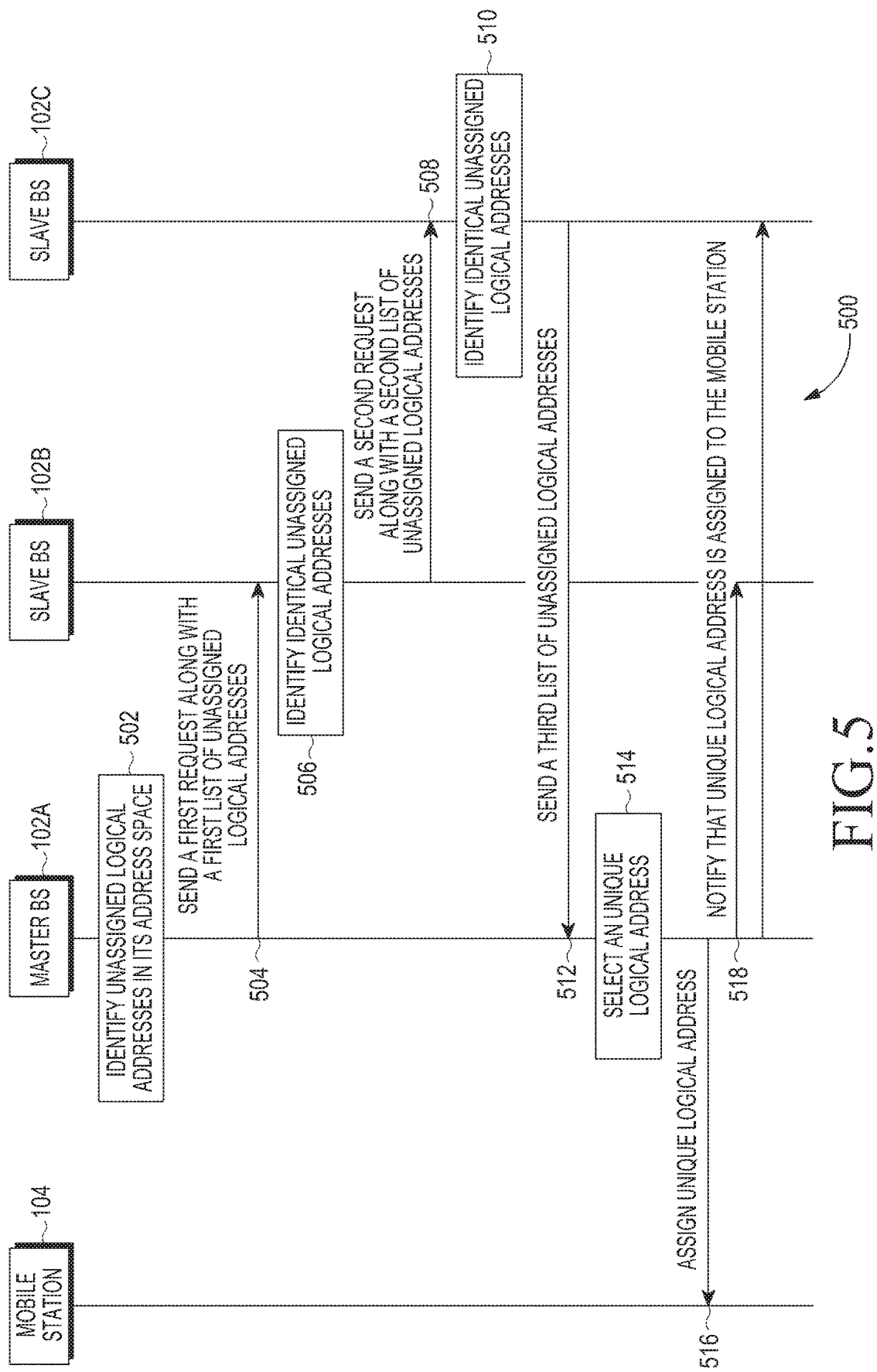
FIG. 5 is a process flow diagram illustrating a method of assigning a unique logical address to the mobile station during formation of the cloud cell according to further another embodiment of the present disclosure.

FIG. 5 is a process flow diagram illustrating a method of assigning a unique logical address to a mobile station during formation of a cloud cell according to further another embodiment of the present disclosure.

Referring to FIG. 5, in a method 500, at operation 502, the master BS 102A identifies unassigned logical addresses in the master BS 102A's address space. At operation 504, the master BS 102A sends a first request to the slave BS 102B for sending unassigned logical addresses in the master BS 102A's respective address space along with a first list of identified unassigned logical addresses and a list of pending slave BSs (i.e., containing the slave BS 102C). At operation 506, the slave BS 102B identifies identical unassigned logical addresses in the address spaces of the slave BS 102B and the master BS 102A using the first list of identified unassigned logical addresses received from the master BS 102A. At operation 508, the slave BS 102B sends a second request to the slave BS 102C for sending unassigned logical addresses in the slave BS 102B's respective address space along with a second list of identical unassigned logical addresses and an empty list of pending BSs (e.g., after removing the slave BS 102C from the list). In some various embodiments, if the slave BS 102B is unable to communicate with the slave BS 102C provided in the list of pending BSs or the list of pending BSs received from the master BS 102A is empty, the slave BS 102B sends a second list of identical unassigned logical addresses and an empty list of pending BSs to the master BS 102A. If the slave BS 102B is unable to communicate with the slave BS 102C, the master BS 102A sends a second request to the slave BS 102C for sending unassigned logical addresses in the master BS 102A's respective address space along with the second list of identical unassigned logical addresses and the empty list of pending BSs.

At operation 510, the slave BS 102C identifies identical unassigned logical addresses between the address space of the slave BS 102C and the second list of identical unassigned logical addresses received from the master BS 102A. At operation 512, the slave BS 102C sends a third list of identical unassigned logical addresses and the empty list of pending BSs to the master BS 102A to the master BS 102A. In some various embodiments, the slave BS 102C may determine whether there is any slave BS left in the cloud cell 110A using the list of pending BSs received from the slave BS 102B. If it is determined that one or more slave BSs are left in the cloud cell 110A, the operations 508, 510 and 512 are repeated till the master BS 102A receives a list of identical unassigned addresses from the last slave BS.

In this case, since the list of pending BSs is empty, the master BS 102A directly performs operation 514. At operation 514, the master BS 102A selects a unique logical address from the one or more identical unassigned logical addresses in the third list of identical unassigned logical addresses received from the slave BS 102C. At operation 516, the master BS 102A assigns the selected unique logical address to the mobile station 104. At operation 518, the master BS 102A notifies assignment of the unique logical address to the mobile station 104 to the slave BSs 102B and 102C. Accordingly, the BSs 102A through 102C and the mobile station 104 communicate in the cloud cell 110A using the unique logical address.

Figure 6:
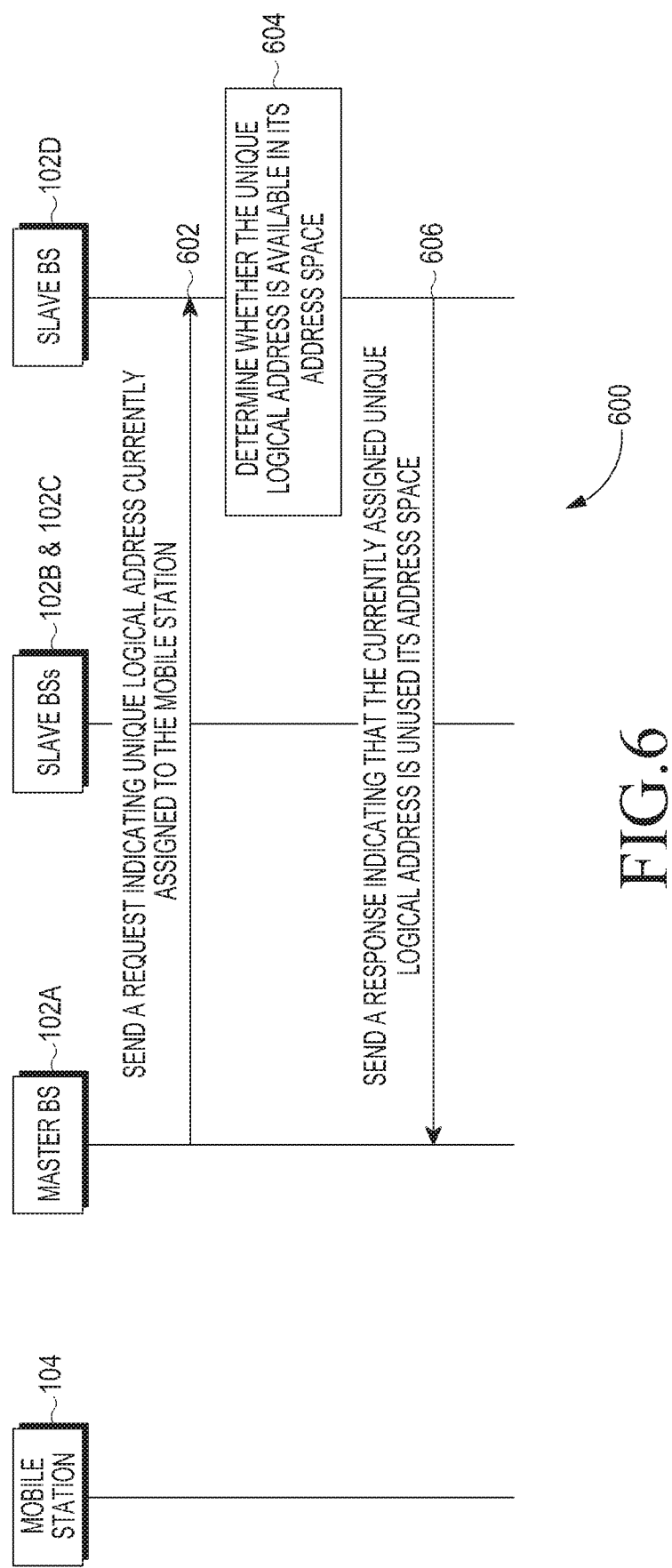
FIG. 6 is a process flow diagram illustrating a method of assigning unique logical address to the mobile station when the cloud cell is updated according to an embodiment of the present disclosure.

FIG. 6 is a process flow diagram 600 illustrating a method of assigning a unique logical address to a mobile station when a cloud cell is updated according to one embodiment of the present disclosure.

Referring to FIG. 6, in a method 600, consider that the cloud cell 110A consists of base stations 102A through 102C and a mobile station 104. Also, consider that the base station 102 is a master base station (BS) and the base stations 102B and 102C are slave BSs. Now consider that a new slave BS 102D is added to the cloud cell 110A. In such case, the master BS 102A sends a request indicating the unique logical address currently assigned to the mobile station 104 in the cloud cell 110A to the newly added slave base station 102D, at operation 602. At operation 604, the newly added slave BS 102D determines whether the unique logical address currently assigned to the mobile station 104 is unused in the slave BS 102D's address space. Consider that, the slave BS 102D determines that the unique logical address currently assigned to the mobile station 104 is unused in the slave BS 102D's address space. Accordingly, at operation 606, the newly added slave BS 102D sends a response indicating that the unique logical address currently assigned to the mobile station 104 is unused in the slave BS 102D's address space to the master BS 102A. Since, the unique logical address is unassigned among address spaces of the BSs 102A through 102D, the mobile station 104 and the BSs 102A-D continue to communicate in the cloud cell 110A using the currently assigned unique logical address.

Figure 7:
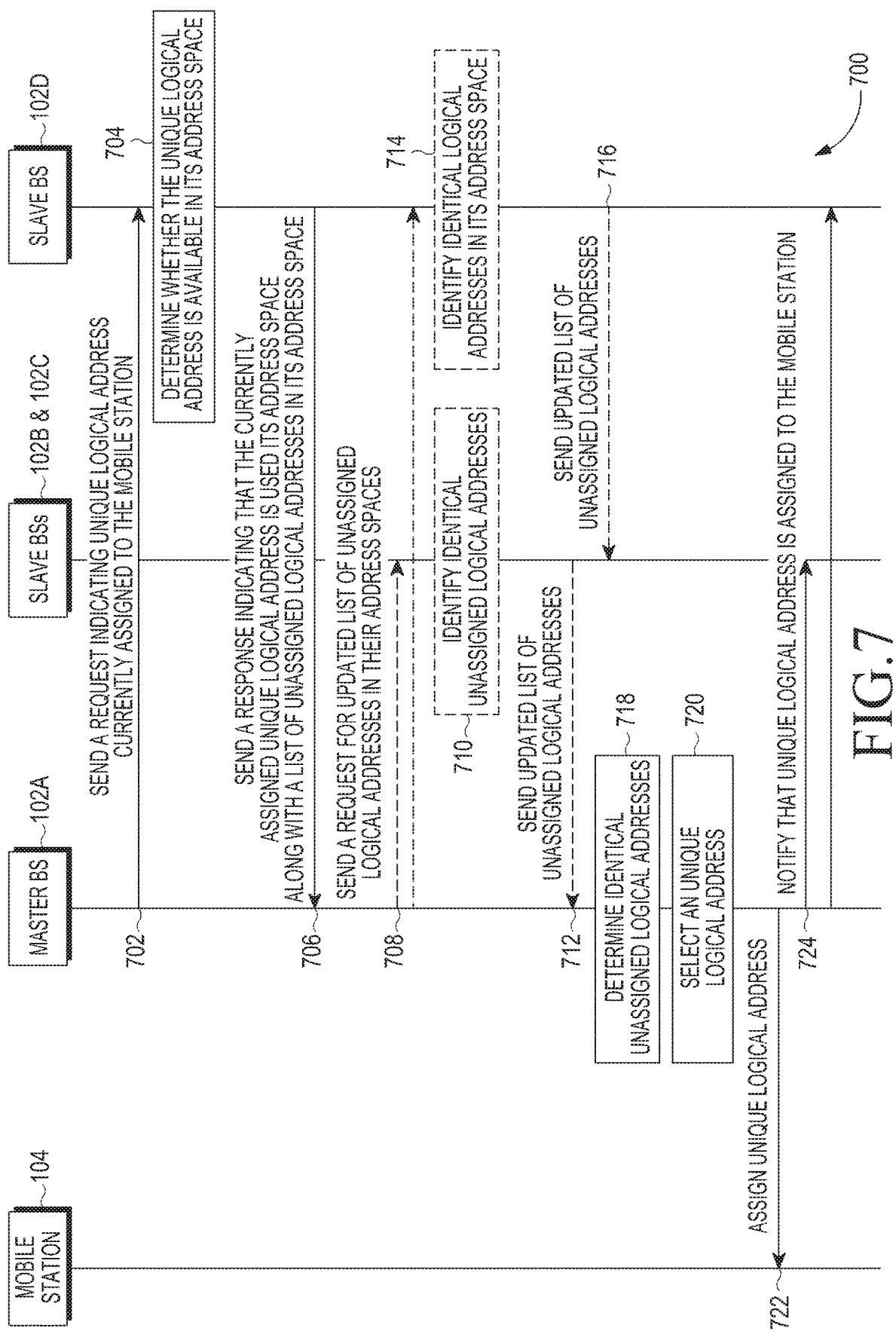
FIG. 7 is a process flow diagram illustrating a method of assigning unique logical address to the mobile station when the cloud cell is updated, according to another embodiment.

FIG. 7 is a process flow diagram illustrating a method of assigning a unique logical address to a mobile station when a cloud cell is updated according to another embodiment of the present disclosure.

Referring to FIG. 7, in a method 700, when a new slave BS 102D is added to a cloud cell 110A, then at operation 702, a master BS 102A sends a request indicating the unique logical address currently assigned to a mobile station 104 in the cloud cell 110A to the newly added slave base station 102D. At operation 704, the newly added slave BS 102D determines whether the unique logical address currently assigned to the mobile station 104 is unused in the slave BS 102D's address space. Now consider that, the slave BS 102D determines that the unique logical address currently assigned to the mobile station 104 is already used in the slave BS 102D's address space. Accordingly, at operation 706, the newly added slave BS 102D sends a response indicating that the unique logical address currently assigned to the mobile station 104 is used in the slave BS 102D's address space along with a list of unused logical addresses in the slave BS 102D's address space to the master BS 102A.

At operation 708, the master BS 102A sends a request for updated list of unassigned logical addresses to the slave BSs 102B and 102C. At operation 710, the slave BS 102B identifies unassigned logical addresses in the slave BS 102B's address space. At operation 712, the slave BS 102B sends an updated list of unassigned logical address to the master BS 102A based on the identified unassigned logical addresses. Similarly, at operation 714, the slave BS 102C identifies unassigned logical addresses in the slave BS 102C's address space. At operation 716, the slave BS 102C sends an updated list of unassigned logical address to the master BS 102A based on the identified unassigned logical addresses.

Figure 10:
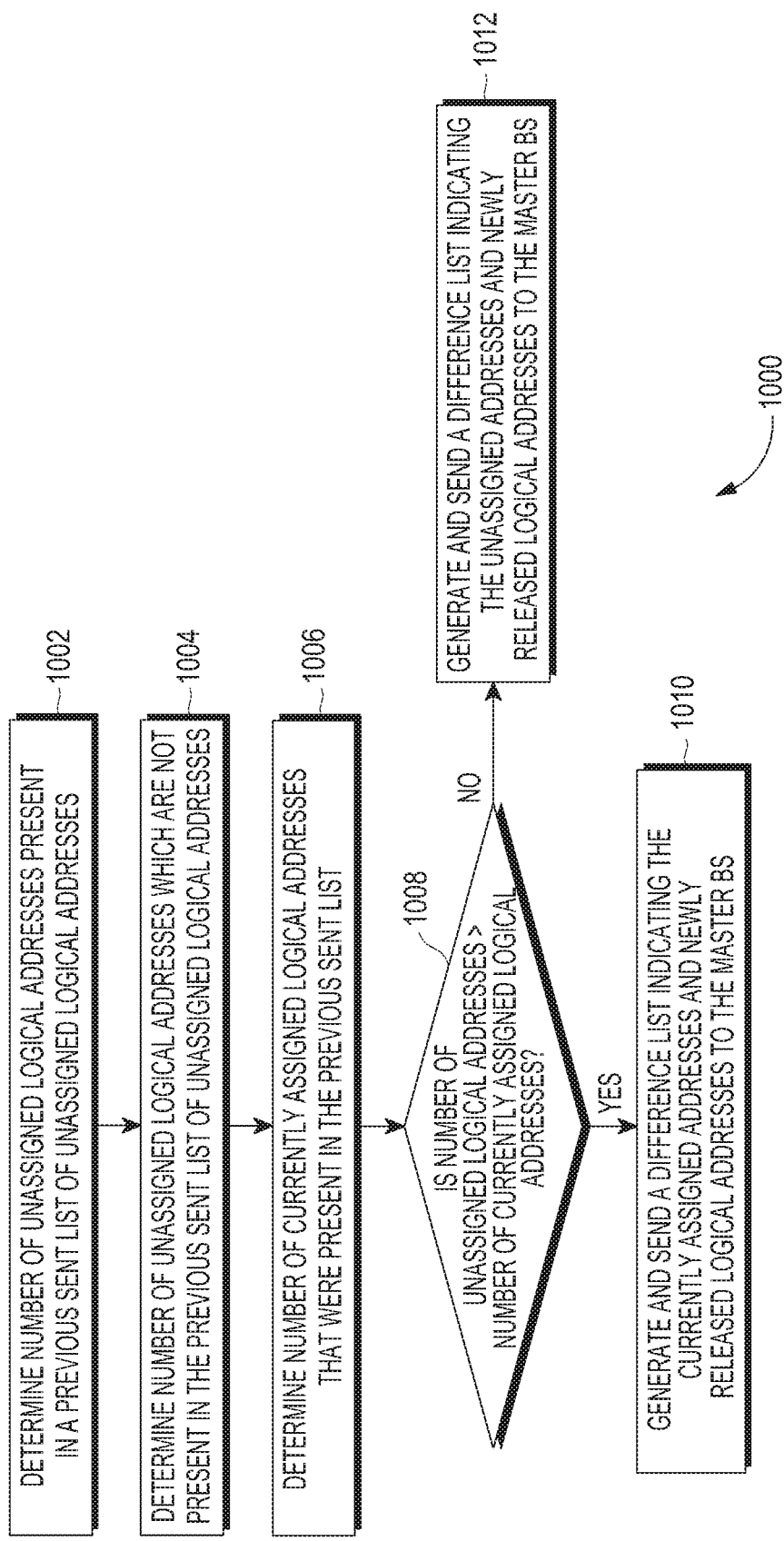
FIG. 10 is a process flowchart illustrating a method of generating a difference list of unassigned logical addresses by a slave BS according to an embodiment of the present disclosure.

It may be noted that, the operations 708, 710, 712, 714 and 716 are not performed if the latest list of unassigned logical addresses are available with the master BS 102A. In this case, the slave BSs 102B and 102C sends an updated list of unassigned logical addresses in their address spaces either periodically or whenever there is a change in the previously sent list of unassigned logical addresses. In some various embodiments, the master BS 102A sends a request for updated list of unassigned addresses if the updated list of unassigned logical addresses is not available with the master BS 102A. In these various embodiments, the slave BSs 102B and 102C sends a difference list of unassigned logical addresses based on a current list of unassigned logical addresses and a previous list of unassigned logical addresses sent earlier to the master BS 102A. The method of generating the difference list of unassigned logical addresses is illustrated in FIG. 10.

At operation 718, the master BS 102A determines one or more identical unassigned logical addresses using the unassigned logical addresses associated with the master BS 102A, the unassigned logical addresses in the updated list received from the slave BSs 102B and 102C, and the unassigned logical addresses associated with the newly added slave BS 102D. At operation 720, the master BS 102A selects a unique logical address from the one or more identical unassigned logical addresses. At operation 722, the master BS 102A assigns the selected unique logical address to the mobile station 104. At operation 724, the master BS 102A notifies assignment of the unique logical address to the mobile station 104 to the slave BSs 102B through 102D. Accordingly, the BSs 102A through 102D and the mobile station 104 communicate in the cloud cell 110A using the unique logical address.

Figure 8:
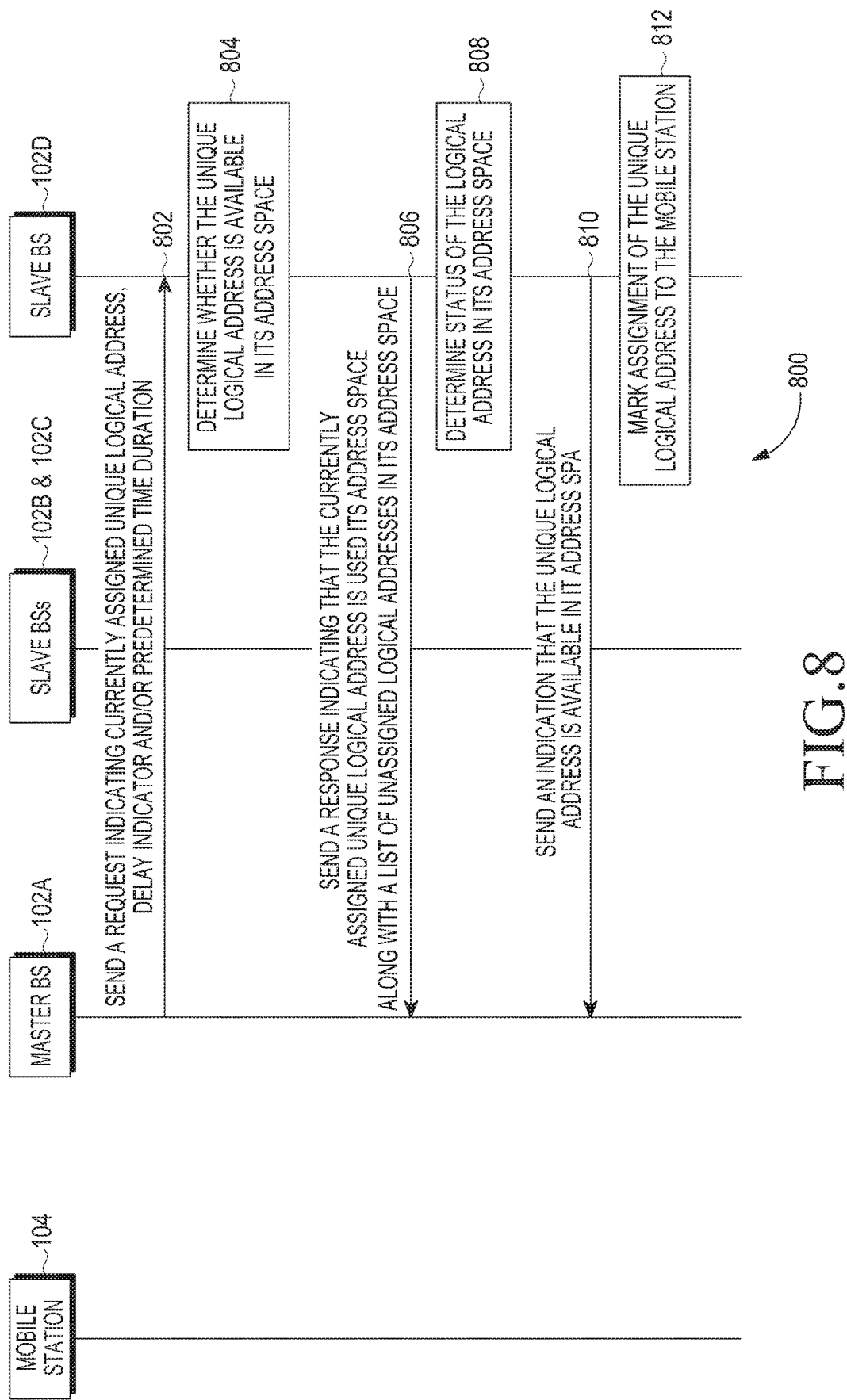
FIG. 8 is a process flow diagram illustrating a method of assigning unique logical address to the mobile station when the cloud cell is updated according to yet another embodiment of the present disclosure.

FIG. 8 is a process flow diagram illustrating a method of assigning a unique logical address to a mobile station when a cloud cell is updated according to yet another embodiment of the present disclosure.

Referring to FIG. 8, in a method 800, when a new slave BS 102D is added to a cloud cell 110A, then at operation 802, a master BS 102A sends a request to the newly added slave base station 102D indicating the unique logical address currently assigned to the mobile station 104 in the cloud cell 110A along with a delay indicator indicating that the slave BS 102D will not be immediately used by the master BS 102A.

At operation 804, the newly added slave BS 102D determines whether the unique logical address currently assigned to the mobile station 104 is unused in the slave BS 102D's address space. Now consider that, the slave BS 102D determines that the unique logical address currently assigned to the mobile station 104 is already used in the slave BS 102D's address space. Accordingly, at operation 806, the newly added slave BS 102D sends a response indicating that the unique logical address currently assigned to the mobile station 104 is used in the slave BS 102D's address space along with a list of unused logical addresses in the slave BS 102D's address space to the master BS 102A. Upon receiving the response, the master BS 102A defers selection of a unique logical address to the mobile station 104 as indicated in the request.

While the selection is deferred, the newly added slave BS 102D periodically determines status of the unique logical address currently assigned to the mobile station 104 in the slave BS 102D's address space, at operation 808. At operation 810, the newly added slave BS 102D sends an indication that the unique logical address currently assigned to the mobile station 104 is available in the slave BS 102D's address space to the master BS 102A. Since, the unique logical address is unassigned among address spaces of the BSs 102A through 102D, the mobile station 104 and the BSs 102A-D continue to communicate in the cloud cell 110A using the currently assigned unique logical address. At operation 812, the newly added slave BS 102D marks the unique logical address currently assigned to the mobile station 104 as used in the slave BS 102D's address space.

Figure 9:
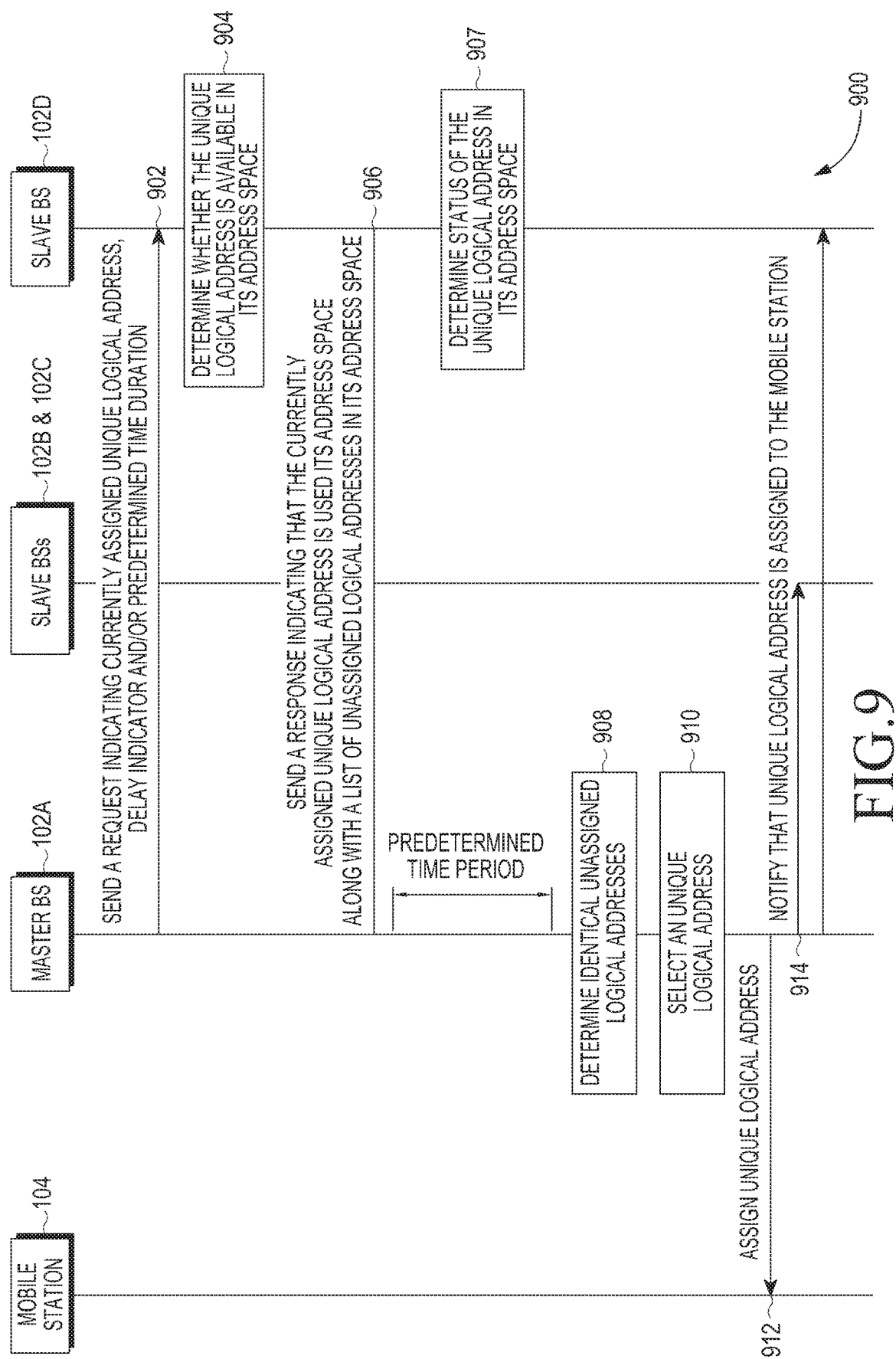
FIG. 9 is a process flow diagram illustrating a method of assigning unique logical address to the mobile station when the cloud cell is updated according to yet another embodiment of the present disclosure.

FIG. 9 is a process flow diagram illustrating a method of assigning a unique logical address to a mobile station when a cloud cell is updated according to yet another embodiment of the present disclosure.

Referring to FIG. 9, in method 900, when a new slave BS 102D is added to a cloud cell 110A, then at operation 902, a master BS 102A sends a request to the newly added slave BS 102D indicating the unique logical address currently assigned to a mobile station 104 in the cloud cell 110A along with a delay indicator indicating that the slave BS 102D will not be used by the master BS 102A for a predetermined duration.

At operation 904, the newly added slave BS 102D determines whether the unique logical address currently assigned to the mobile station 104 is unused in the newly added slave BS 102D's address space. Now consider that, the slave BS 102D determines that the unique logical address currently assigned to the mobile station 104 is already used in the newly added slave BS 102D's address space. Accordingly, at operation 906, the newly added slave BS 102D sends a response indicating that the unique logical address currently assigned to the mobile station 104 is used in the newly added slave BS 102D's address space along with a list of unused logical addresses in the newly added slave BS 102D's address space to the master BS 102A. Upon receiving the response, the master BS 102A defers selection of a unique logical address to the mobile station 104 till the predetermined time duration as indicated in the request.

While the selection is deferred, the newly added slave BS 102D periodically determines status of the unique logical address currently assigned to the mobile station 104 in the newly added slave BS 102D's address space, at operation 907. If the unique logical address currently assigned to the mobile station 104 is used in the address space of the slave BS 102D till the expiry of the predetermined time duration, then the master BS 102A performs operation 908. At operation 908, the master BS 102A determines one or more identical unassigned logical addresses using the unassigned logical addresses associated with the master BS 102A, the unassigned logical addresses in the updated list received from the slave BSs 102B and 102C, and the unassigned logical addresses associated with the newly added slave BS 102D. At operation 910, the master BS 102A selects a unique logical address from the one or more identical unassigned logical addresses. At operation 912, the master BS 102A assigns the selected unique logical address to the mobile station 104. At operation 914, the master BS 102A notifies assignment of the unique logical address to the mobile station 104 to the slave BSs 102B through 102D. Accordingly, the BSs 102A through 102D and the mobile station 104 communicate in the cloud cell 110A using the new assigned unique logical address.

FIG. 10 is a process flowchart illustrating a method of generating a difference list of unassigned logical addresses by a slave BS according to one embodiment of the present disclosure.

In some various embodiments, the slave BSs 102B and 102C send an updated list of unassigned logical addresses in their address spaces either periodically or whenever there is a change in the previously sent list of unassigned logical addresses. In other various embodiments, the slave BSs 102B and 102C send an updated list of unassigned logical addresses in their address spaces when such request for sending the updated list is received from the master BS 102A. The master BS 102A may send such request when a new BS joins or exits the cloud cell 110A. The following operations are performed by a slave BS (e.g., the slave BS 102B) in generating the difference list of unassigned logical addresses.

Referring to FIG. 10, in method 1000, at operation 1002, number of unassigned logical addresses present in a previously sent list of unassigned logical addresses is determined by the slave BS 102B. At operation 1004, number of unassigned logical addresses which are not present in the previously sent list of unassigned logical addresses is determined. It may be noted that, the unassigned logical addresses which are not present the previously sent list are logical addresses that are newly released after sending the previously sent list. At operation 1006, number of currently assigned logical addresses that were present in the previously sent list as unassigned logical addresses is determined.

At operation 1008, it is determined whether the number of unassigned logical addresses present in the previously sent list is greater than the number of the currently assigned logical addresses. If the number of unassigned addresses is greater than the number of currently assigned logical addresses, then at operation 1010, a difference list indicating the currently assigned logical addresses (which were unassigned logical addresses in the previously sent list) and the newly released logical addresses is generated and sent to the master BS 102A. If the number of unassigned addresses is less than the number of currently assigned logical addresses, then at operation 1012, a difference list indicating the unassigned logical addresses present in the previously sent list and the newly released logical addresses is generated and sent to the master BS 102A.

In one embodiment, a transmitter (e.g., the master BS or slave BS) may indicate assigned or unassigned addresses in terms of a bitmap, wherein each bit corresponds to a logical address in the address space and wherein the size of bit map (i.e., number of bits in bitmap) is equal to number of addresses in the address space. The bit indicates whether corresponding logical address in the address space is assigned or not.

In alternate embodiment, a set of logical addresses in the address space may be grouped into subgroups. The transmitter may indicate assigned or unassigned addresses in terms of subgroup identifier, subgroup bitmap, wherein each bit in subgroup bitmap corresponds to an address in the subgroup. The transmitter may indicate number of subgroups and subgroup identifier using number of subgroups and subgroup identifier fields. Alternatively, the transmitter may indicate the number of subgroups and the subgroup identifier using subgroup identifier bitmap, wherein each bit corresponds to a subgroup identifier.

In accordance with the foregoing description, it may be noted that the transmitter may indicate unassigned address information via a list of assigned logical addresses. This helps reduce signaling overhead especially when number of assigned logical addresses is smaller than number of unassigned logical addresses. Since, the total logical addresses in the address space are known to a receiver (e.g., a slave BS or a master BS), the receiver may determine the list of unassigned addresses from the list of assigned addresses received from the transmitter.

Figure 11:
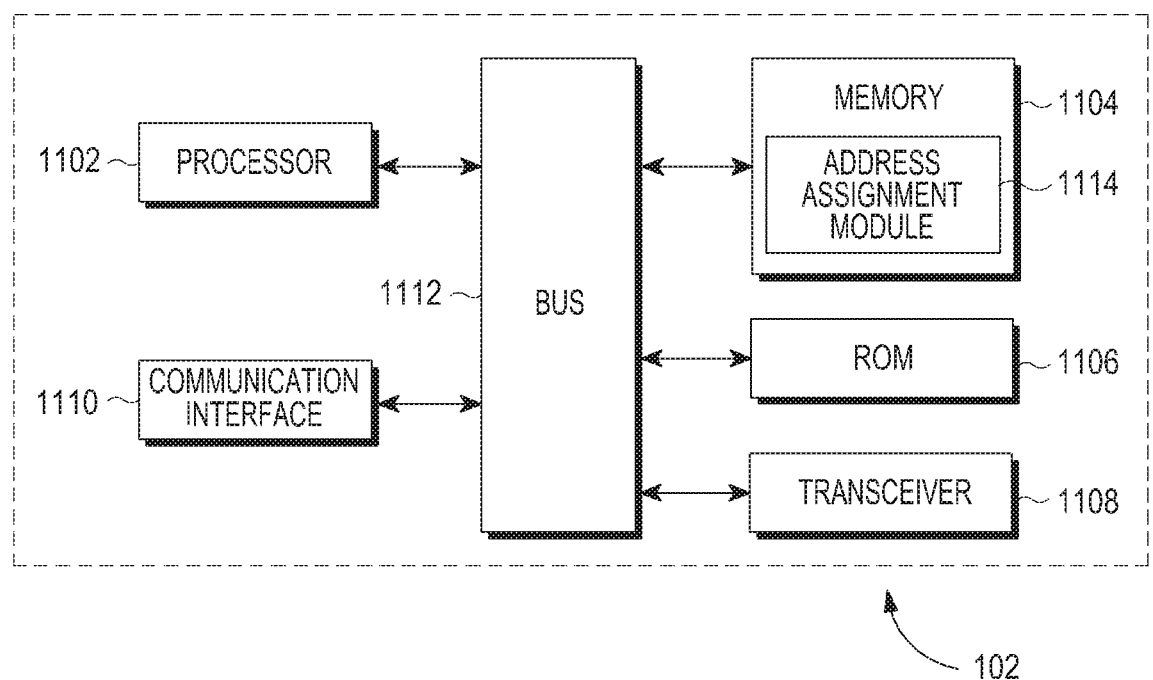
FIG. 11 illustrates a block diagram of a BS, such as those shown in FIG. 1 according to an embodiment of the present disclosure.

FIG. 11 illustrates a block diagram of the BS 102, such as those shown in FIG. 1, according to an embodiment of the present disclosure.

Referring to FIG. 11, the BS 102 includes a processor 1102, memory 1104, a read only memory (ROM) 1106, a transceiver 1108, a communication interface 1110, and a bus 1112.

The processor 1102, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1102 may also include embedded controllers, such as generic or programmable logic devices or arrays, application specific integrated circuits, single-chip computers, smart cards, and the like.

The memory 1104 may be volatile memory and non-volatile memory. The memory 1104 may include an address assignment module 1114 for assigning a unique logical address, which is unused in the address spaces of BSs 102A-D, to the mobile station 104 in the cloud cell 110A, according to the various embodiments illustrated in FIGS. 1 to 10. A variety of computer-readable storage media may be stored in and accessed from the memory elements. Memory elements may include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Various embodiments of the present subject matter may be implemented in conjunction with modules including functions, procedures, data structures, and application programs, for performing tasks, defining abstract data types, or low-level hardware contexts. The address assignment module 1114 may be stored in the form of machine-readable instructions on any of the above-mentioned storage media and is executable by the processor 1102. For example, a computer program may include the machine-readable instructions capable of assigning a unique logical address, which is unused in the address spaces of BSs 102A-D, to the mobile station 104 in the cloud cell 110A, according to the teachings and herein described various embodiments of the present subject matter. The computer program may be included on a non-transitory computer-readable storage medium and loaded from the storage medium to a hard drive in the non-volatile memory.

The components such as the ROM 1106, the transceiver 1108, the communication interface 1110, and the bus 1112 are well known to the person skilled in the art and hence the explanation is thereof omitted.

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of assigning an address by a first base station (BS) included in a plurality of BSs, the plurality of BSs forming a cell for a mobile station (MS), the method comprising:
    identifying a second BS added to the cell based on movement of the MS;
    transmitting, to the second BS, a request message including information about a time duration and information about a first address assigned to the MS before the second BS is added to the cell, the time duration including a time period for identifying whether the first address is used in an address set of the second BS;
    receiving, from the second BS, a response message indicating that the first address is used in the address set of the second BS and information about at least one unassigned address in the address set of the second BS; and
    assigning, to the MS, a second address for identifying the MS in an updated cell by using the information about the at least one unassigned address in the address set of the second BS and information about at least one unassigned address in an address set of each of the plurality of BSs based on the response message,
    wherein the updated cell is the cell to which the second BS is added.

2. The method of claim 1, further comprising:
    transmitting information about the second address to a plurality of BSs excluding the first BS in the updated cell.

3. The method of claim 1,
    wherein the assignment of the second address is deferred until the time duration expires.

4. The method of claim 1, wherein the assigning of the second address comprises:
    obtaining one or more identical addresses from the information about the at least one unassigned address in the address set of the second BS and the information about the at least one unassigned address in the address set of each of the plurality of BSs;
    selecting one of the obtained one or more identical addresses; and
    assigning, to the MS, the selected address as the second address.

5. The method of claim 1, wherein the second address is used to perform communication between the MS and each of the plurality of BSs and the second BS in the updated cell.

6. A method of performing a communication by a mobile station (MS) with a plurality of base stations (BSs) forming a cell for the MS, the method comprising:
    receiving, from a first base station (BS) included in the plurality of BSs, information about a first address assigned to the MS in the cell;
    receiving, from the first BS, information about a second address assigned to the MS in an updated cell, the updated cell being the cell to which a second BS is added based on movement of the MS; and
    performing a communication with each of the plurality of BSs and the second BS in the updated cell based on the second address,
    wherein the second address is used to identify the MS in the updated cell,
    wherein the second address is determined in the first BS by using information about at least one unassigned address in an address set of each of the plurality of BSs and information about at least one unassigned address in an address set of the second BS,
    wherein the information about the at least one unassigned address in the address set of the second BS is obtained by the first BS based on a response message transmitted from the second BS to the first BS in response to a request message transmitted from the first BS to the second BS,
    wherein the request message includes information about a time duration and information about the first address assigned to the MS before the second BS is added to the cell, the time duration including a time period for identifying whether the first address is used in the address set of the second BS, and
    wherein the response message indicates that the first address is used in the address set of the second BS.

7. The method of claim 6,
    wherein the second address is selected from one or more identical addresses, and
    wherein the one or more identical addresses are obtained from the information about the at least one unassigned address in the address set of the second BS and the information about the at least one unassigned address in the address set of each of the plurality of BSs.

8. The method of claim 6, wherein the assignment of the second address is deferred until the time duration expires.

9. The method of claim 6, wherein the information about the second address is transmitted to a plurality of BSs excluding the first BS in the updated cell.

10. A first base station (BS) included in a plurality of BSs forming a cell for a mobile station (MS), the first BS comprising:
    a transceiver; and
    at least one processor configured to:
        identify a second BS added to the cell based on movement of the MS,
        control the transceiver to transmit, to the second BS, a request message including information about a time duration and information about a first address assigned to the MS before the second BS is added to the cell, the time duration including a time period for identifying whether the first address is used in an address set of the second BS, control the transceiver to receive, from the second BS, a response message indicating that the first address is used in the address set of the second BS and information about at least one unassigned address in the address set of the second BS, and assign, to the MS, a second address for identifying the MS in an updated cell by using the information about the at least one unassigned address in the address set of the second BS and information about at least one unassigned address in an address set of each of the plurality of BSs based on the response message, wherein the updated cell is the cell to which the second BS is added.

11. The first BS of claim 10, wherein the transceiver is further configured to:

transmit information about the second address to a plurality of BSs excluding the first BS in the updated cell.

12. The first BS of claim 10, wherein the assignment of the second address is deferred until the time duration expires.

13. The first BS of claim 10, wherein the at least one processor is further configured to:

obtain one or more identical addresses from the information about the at least one unassigned address in the address set of the second BS and the information about the at least one unassigned address in the address set of each of the plurality of BSs, select one of the obtained one or more identical addresses, and assign, to the MS, the selected address as the second address.

14. The first BS of claim 10, wherein the second address is used to perform communication between the MS and each of the plurality of BSs and the second BS in the updated cell.

15. A mobile station (MS) for performing a communication with a plurality of base stations (BSs) forming a cell for the MS, the MS comprising:

a transceiver; and at least one processor configured to:

control the transceiver to receive, from a first base station (BS) included in the plurality of BSs, information about a first address assigned to the MS in the cell, control the transceiver to receive, from the first BS, information about a second address assigned to the MS in an updated cell, the updated cell being the cell to which a second BS is added based on movement of the MS, and perform a communication with each of the plurality of BSs and the second BS in the updated cell based on the second address, wherein the second address is used to identify the MS in the updated cell, wherein the second address is determined in the first BS by using information about at least one unassigned address in an address set of each of the plurality of BSs and information about at least one unassigned address in an address set of the second BS, wherein the information about the at least one unassigned address in the address set of the second BS is obtained by the first BS based on a response message transmitted from the second BS to the first BS in response to a request message transmitted from the first BS to the second BS, wherein the request message includes information about a time duration and information about the first address assigned to the MS before the second BS is added to the cell, the time duration including a time period for identifying whether the first address is used in the address set of the second BS, and wherein the response message indicates that the first address is used in the address set of the second BS.

16. The MS of claim 15, wherein the second address is selected from one or more identical addresses, and wherein the one or more identical addresses are obtained from the information about the at least one unassigned address in the address set of the second BS and the information about the at least one unassigned address in the address set of each of the plurality of BSs.

17. The MS of claim 15, wherein the assignment of the second address is deferred until the time duration expires.

18. The MS of claim 15, wherein the information about the second address is transmitted to a plurality of BSs excluding the first BS in the updated cell.

* * * * *